United States Patent [19]

Brazelton et al.

[11] Patent Number: 4,920,519

[45] Date of Patent: Apr. 24, 1990

[54] DUAL-PUMP MIXING AND FEEDING APPARATUS

[75] Inventors: Carl L. Brazelton, Austin, Tex.; Troy C. Litherland, Bradley; James G. Johnston, Yorkville, both of Ill.

[73] Assignee: Stranco, Inc., Bradley, Ill.

[21] Appl. No.: 783,854

[22] Filed: Oct. 3, 1985

[51] Int. Cl.$^5$ .......... B01F 5/04; B01F 7/20; B01F 15/02; G05D 11/02

[52] U.S. Cl. .......... 366/161; 366/172; 366/173; 366/182; 366/314

[58] Field of Search .......... 366/160, 161, 152, 172, 366/173, 177, 182, 76, 314; 422/135, 137, 259

[56] References Cited

U.S. PATENT DOCUMENTS

| | | | |
|---|---|---|---|
| 3,128,995 | 4/1964 | Shaeffer | 422/135 |
| 3,606,271 | 9/1971 | Schmidt et al. | 366/152 |
| 3,807,701 | 4/1974 | Reid et al. | 366/132 |
| 4,125,574 | 11/1978 | Kastner et al. | 422/135 |
| 4,135,825 | 1/1979 | Kertscher | 366/79 |
| 4,263,926 | 4/1981 | Drake et al. | 366/168 |
| 4,433,701 | 2/1984 | Cox et al. | 366/152 |
| 4,522,502 | 6/1985 | Brazelton | 366/160 |
| 4,533,254 | 8/1985 | Cook et al. | 366/176 |

FOREIGN PATENT DOCUMENTS

| | | | |
|---|---|---|---|
| 237566 | 2/1962 | Australia | 366/161 |

*Primary Examiner*—Harvey C. Hornsby
*Assistant Examiner*—Joseph S. Machuga
*Attorney, Agent, or Firm*—Emrich & Dithmar

[57] ABSTRACT

The apparatus includes a frame in which a vessel is mounted. Water is delivered into the vessel through one inlet, polymer is delivered into the vessel through a second inlet, and a further liquid is delivered into the vessel through a further inlet. A pulsating pump delivers the polymer to the vessel and a continuously operated pump delivers the further liquid into the vessel. Either pump can be energized separately or both pumps can be energized depending upon the situation. For example, the polymer pump is energized when it is desired to deliver an emulsion polymer to the vessel and the other pump is energized when one wants to deliver a solution polymer.

13 Claims, 4 Drawing Sheets

DUAL-PUMP MIXING AND FEEDING APPARATUS

BACKGROUND OF THE INVENTION

This application deals generally with apparatus which activates and dilutes a polymer. In activating a polymer, compact molecules are uncoiled and extended so that they can perform their task. Some of the uses of activated polymer are purification of water, dewatering of sludge, separating mined materials from water and improving the flow of a liquid through a pipe. Very generally, liquid polymer is available in two configurations: emulsion polymer and solution polymer. Actually, the term "solution" polymer is somewhat of a misnomer; the polymer molecules are actually suspended in the water. Emulsion polymer is much more expensive but also is much more effective. However, the use of emulsion polymer has only recently begun to become widespread. Solution polymer, on the other hand, has been used for many years and is preferred by many because of its low cost. Often times, it is merely a matter of individual preference.

The above-identified application discloses an apparatus which activates and dilutes a polymer, particularly an emulsion polymer. Such apparatus activates and dilutes emulsion polymer in a highly efficient and effective manner. In certain instances, it is desirable to be able to activate and dilute a solution polymer.

The pump used in the apparatus disclosed in the above-identified application uses a diaphragm-type pump which is highly effective in pumping an emulsion polymer. However, solution polymers tend to be more viscous. A diaphragm-type pump is not capable of pumping the solution polymer is sufficiently high rates to be efficient.

Certain polymers, when activated and diluted by the apparatus disclosed in the above-identified application, tend to congeal at the inlet.

SUMMARY OF THE INVENTION

It is, therefore, an important object of the present invention to provide a single apparatus which is capable of delivering emulsion polymer and/or solution polymer without requiring a substantial time to clean the apparatus.

Another object is to provide a mixing and feeding apparatus which has a water inlet, an emulsion polymer inlet and a further inlet for delivering a chemical which minimizes or eliminates congealing of the emulsion polymer ar the second inlet.

In summary, there is provided mixing and feeding apparatus for receiving polymer and water and for activating and diluting the polymer, comprising a frame, a vessel mounted on the frame defining a substantially cylindrical chamber therein, the vessel having a water inlet and a polymer inlet and a further inlet and an outlet, means for carrying water to the water inlet, first pump means for pumping polymer to the polymer inlet, second pump means for pumping a further liquid to the further inlet, outlet means for carrying the activated and diluted polymer away from the outlet of the vessel, an impeller mounted in the chamber for rotation about the cylindrical axis thereof for mixing the polymer and the water, and means for selectively energizing either one or both of the pump means.

The invention consists of certain novel features and a combination of parts hereinafter fully described, illustrated in the accompanying drawings, and particularly pointed out in the appended claims, it being understood that various changes in the details may be made without departing from the spirit, of sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DESCRIPTION OF THE PREFERRED EMBODIMENT

Figure 1:
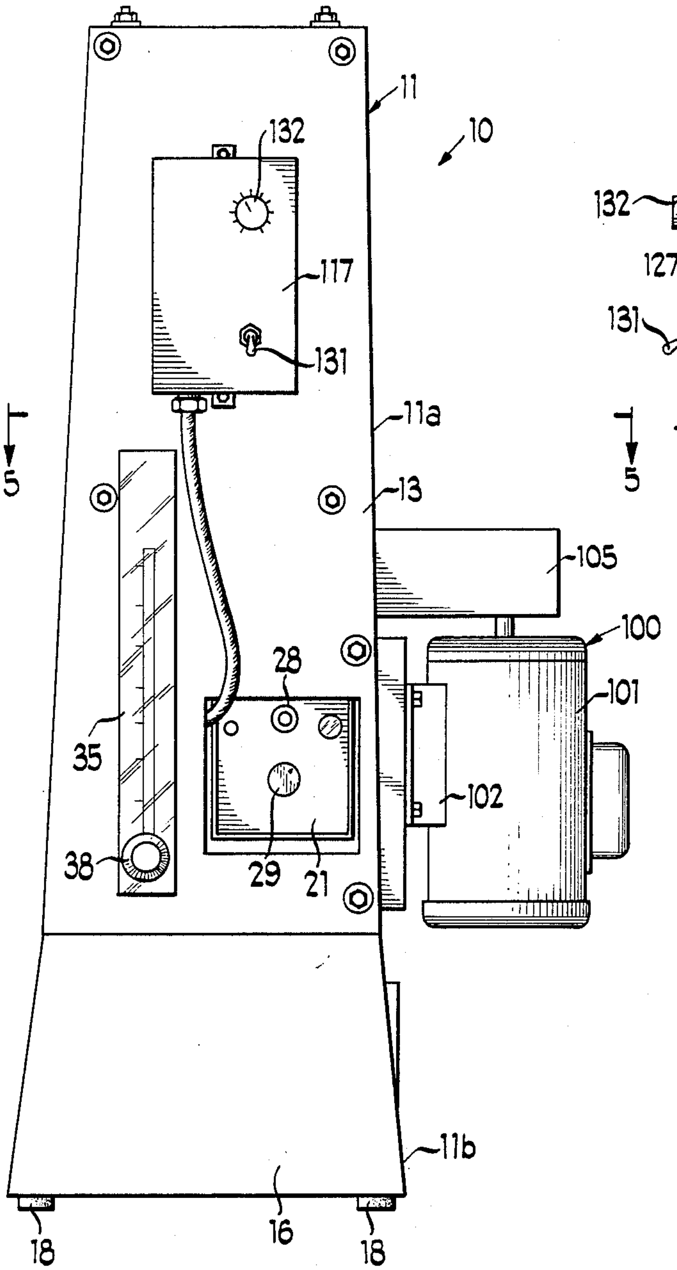
FIG. 1 is a rear elevational view of a mixing and feeding apparatus incorporating the features of the present invention.
Figure 2:
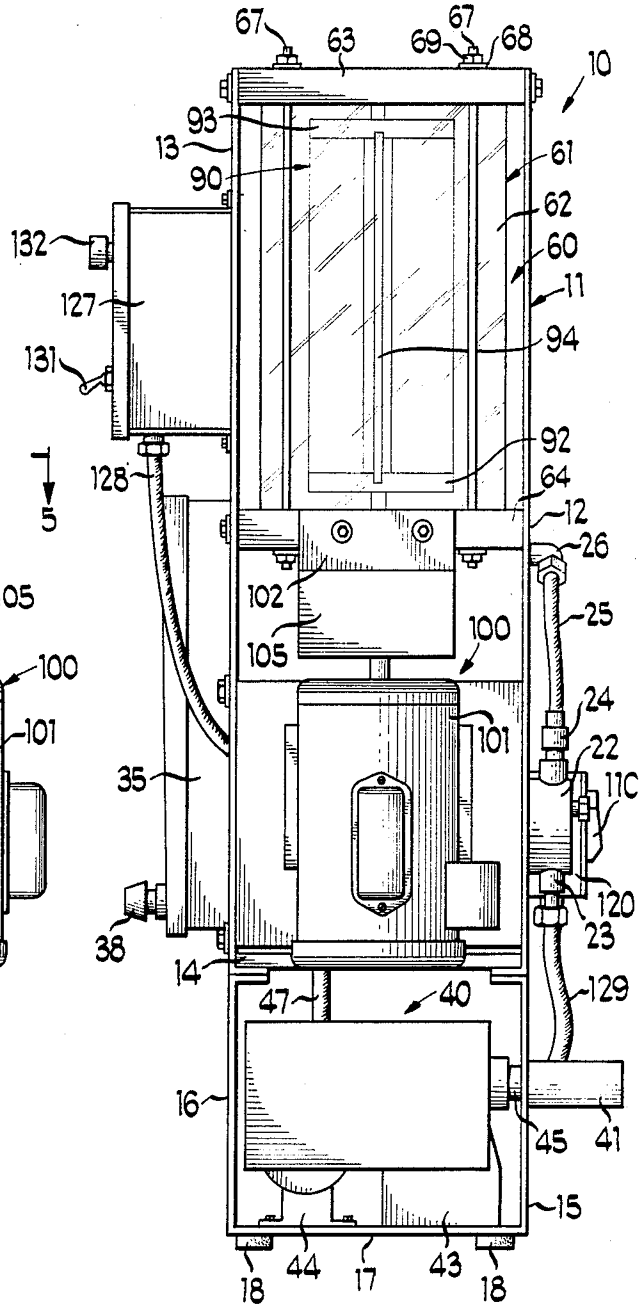
FIG. 2 is a side elevational view of one side of the mixing and feeding apparatus.

Turning now to the drawings, and more particularly to FIGS. 1-4, thereof, there is depicted a mixing and feeding apparatus incorporating the features of the present invention and being generally designated by the numeral 10. The apparatus 10 is designed for use with one or more supplies of concentrated polymer and a source of water. The apparatus 10 mixes the polymer and the water in such a way as to activate the polymer, and provide a homogeneous, diluted, activated polymer of the desired concentration.

The mixing and feeding apparatus 10 comprises a frame 11 having a taller, upper frame section 11*a* and a shorter, lower frame section 11*b*. The frame section 11*a* includes a front panel 12 and a rear panel 13. The bottoms of the panels 12 and 13 are inturned and define flanges that support a square bottom wall 14. The lower section 11*b* includes a front panel 15, a rear panel 16 and a bottom wall 17, all bent from a single sheet of metal. The upper ends of the panels 15 and 16 are inturned to define flanges which are respectively attached to the corresponding flanges of the panels 12 and 13. A set of four feet 18 is attached to the corners of the bottom wall 17.

The mixing and feeding apparatus 10 comprises a polymer delivery mechanism 20, the basic element of which is a diaphragm-type pump 21. The pump 21 includes a totally enclosed pump drive with no exposed moving parts and is capable of moving viscous materials, such as concentrated liquid polymer. The output of the pump is pulsating in order to provide a means of accurately adjusting the delivery rate. The pump 21 has an end or head 22 which is particularly adapted to pump viscous polymer.

An operative embodiment of the mixing and feeding apparatus 10 incorporated a pump made by Liquid Metronics, Incorporated of Acton, Mass. Several different models are available depending upon the requirements. In one embodiment, Model B 131-76 was used. Such pump is adjustable to enable selection of the rate of flow of the polymer from 0.02 gallon per hour to 4.5 gallons per hour at a pressure of 50 psi. Such pump has an adjustable strobe length and strobe frequency and operates on 115 volts AC. A second embodiment used a D131-20 model, which provided a rate of flow of between 0.05 gallon per hour and 10 gallons per hour at a pressure of 35 psi. Other pumps of this type are also usable.

The head 22 has an inlet 23 for connection by way of tubing (not shown) to a drum or tank containing the undiluted or "neat" emulsion polymer. The head 22 also has an outlet 24 which is connected to one end of tubing 25, the other end of which is connected to a fitting 26. A nozzle (not shown) may be incorporated into the head 22 for priming purposes. The stroke frequency is controlled by a knob 28 (FIG. 1) and the stroke length is controlled by a knob 29.

The mixing and feeding apparatus 10 further comprises a water delivery mechanism which includes an inlet port 31 for connection to a supply of water. The inlet port 31 is accessible through a hole in the front panel 12. The inlet port 31 is coupled to a solenoid valve 33, which is normally closed. As soon as power is supplied to the apparatus 10, the valve 33 is opened and water flows through tubing 34 into a flowmeter 35. The flowmeter has a knob 38 to control the rate of flow from zero to, for example, 8 gallons per minute. In an operative embodiment, the flowmeter 35 was made by Dwyer Instruments, Inc. of Michigan City, Ind. A stub 36 (FIG. 7) carrying a pair of O-rings 37 is threaded into the outlet of the flowmeter.

Figure 4:
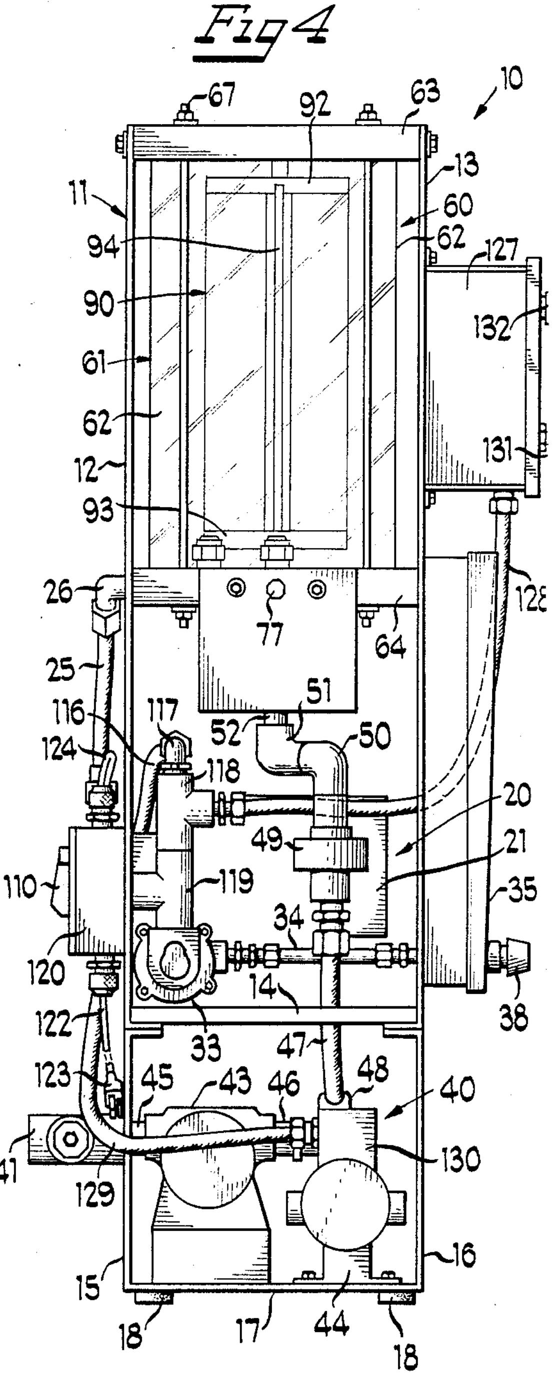
FIG. 4 is a side elevational view of the other side of the mixing and feeding apparatus.
Figure 5:
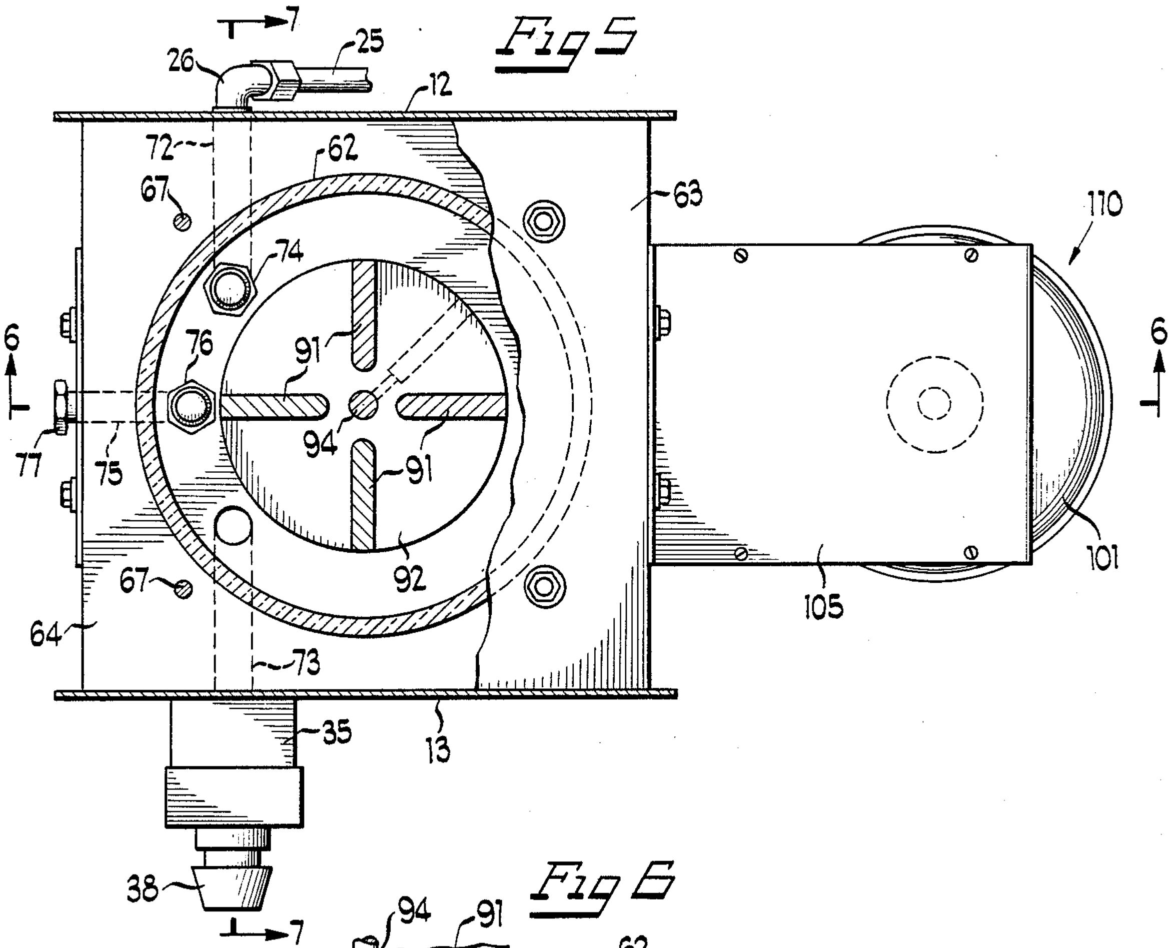
FIG. 5 is a fragmentary, enlarged view in horizontal section taken along the line 5—5 of FIG. 1.

The mixing and feeding apparatus 10 comprises a further-liquid delivery mechanism 40 fundamentally located in the compartment defined by the lower section 11*b*. The delivery mechanism 40 is adapted to deliver a solution polymer, a decongealing agent, or other liquids, as will be described. The mechanism 40 includes an inlet T fitting 41. A plug 42 in one of the legs of the fitting 41 can be removed for priming purposes. Referring to FIG. 4, the fitting 41 is connected to a pump 43 which is driven by a gear motor 44. The further liquid enters the pump 43 by way of a pipe 45 and exits by way of a pipe 46, which is in turn coupled to tubing 47 through a fitting 48. The tubing 47 is connected to a check valve 49, in turn coupled to a pair of elbows 50 and 51 to a pipe 52. In an operative embodiment, the pump/motor 43,44 was a gear pump made by Viking Pump Division of Houdaille Industries, Inc. of Cedar Falls, Iowa. Two models were used. Model No. FH32 supplied 20 gallons per hour at 160 rpm and Model No. G32 provided 40 gallons per hour at 160 rpm. The motor 44 was made by Dayton Electric Manufacturing Co. of Chicago, Ill., Model No. 4Z128 and had a gear ratio of 11:1.

Figure 7:
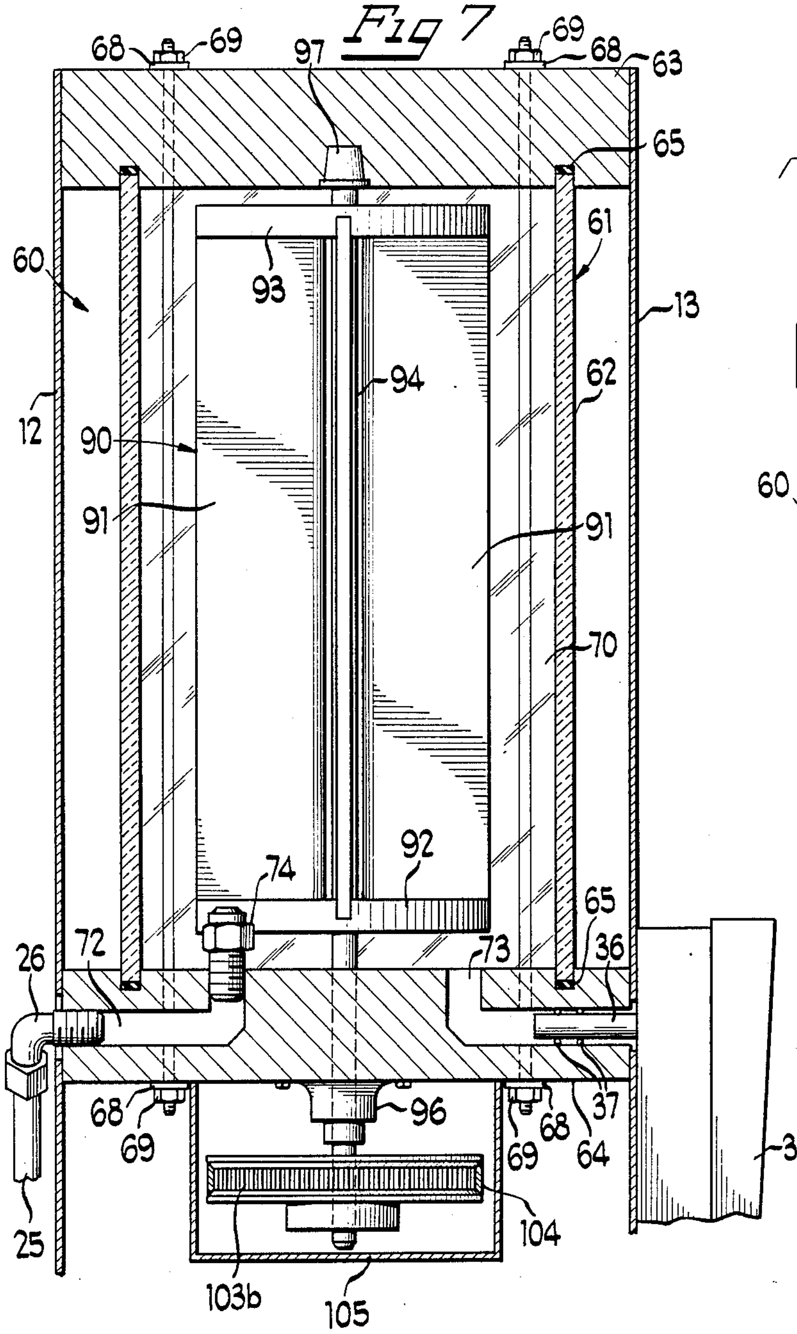
FIG. 7 is a view in vertical section taken along the line 7—7 of FIG. 5.
Figure 8:
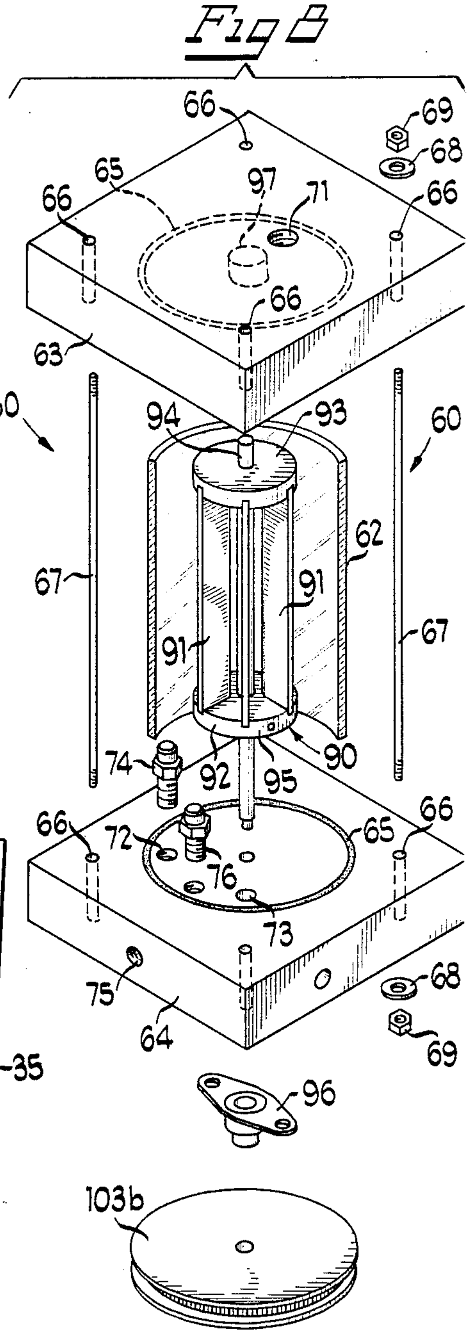
FIG. 8 is an exploded view of the vessel in the mixing and feeding apparatus.

The apparatus 10 further comprises a mixer 60 the details of which are best seen in FIGS. 7 and 8. The mixer 60 includes a cylindrical vessel 61 defined by a generally cylindrical barrel 62, a square top wall 63 and a bottom wall 64. The walls 63 and 64 are preferably formed of hardened plastic. The barrel 62 is preferably formed of clear acrylic so that the operator can observe the interior and thus know whether any malfunction is occurring. In the bottom of the top wall 63 and in the top of the bottom wall 64 is a circular groove having a diameter equal to the diameter of the barrel 62. An O-ring 65 is located in each of the grooves. The ends of the barrel 62 are located in the grooves in contact with the O-rings 65. The top wall 63 has a set of four holes 66 respectively located near the corners, and being vertically aligned with an identical set of four holes 66 in the bottom wall 64. Four rods 67 having threaded ends are located respectively in the vertically aligned pairs of holes and are held in place by means of washers 68 and nuts 69, which compress the O-rings 65 so as to define a liquid-tight chamber 70 inside the vessel 61.

Figure 6:
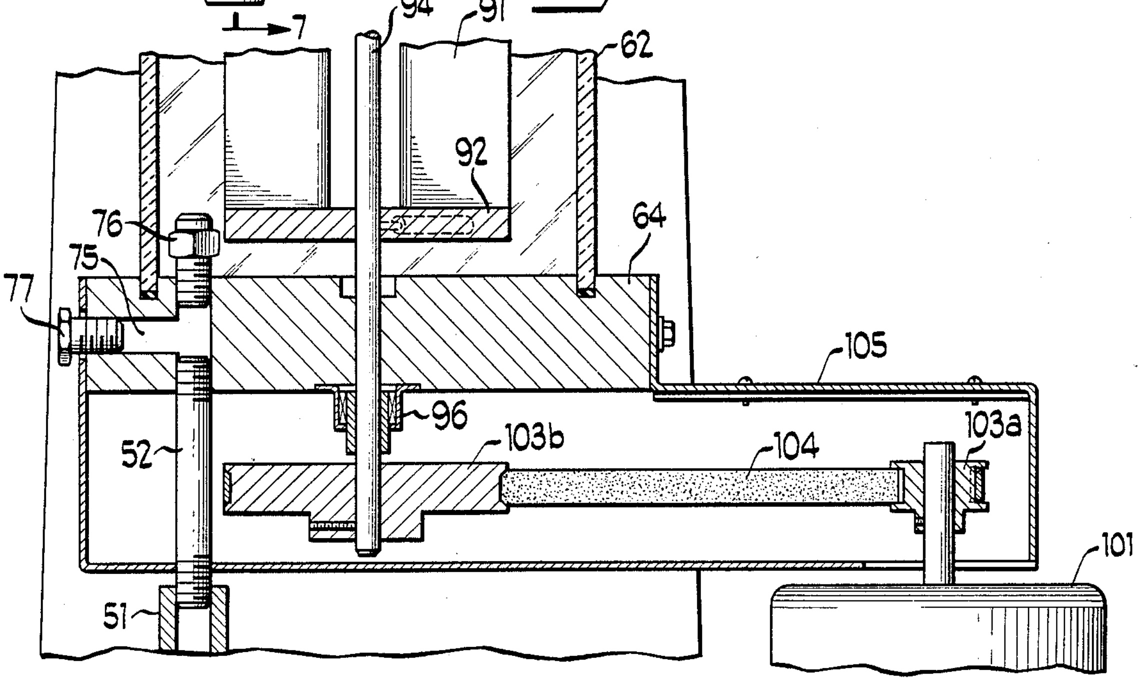
FIG. 6 is a fragmentary view in vertical section taken along the line 6—6 of FIG. 5.

The top wall 63 has a vertically oriented outlet bore 71. Referring to FIGS. 6–8, two L--shaped bores 72 and 73 are formed in the wall 64. Both legs of the bore 72 are threaded, while the two legs of the bore 73 are unthreaded. The longer legs of the bores 72 and 73 are horizontally oriented in coaxial alignment. The shorter legs of the bores 72 and 73 are vertically oriented and have their axes generally parallel. The longer leg of the bore 72 receives the elbow fitting 26 (FIG. 3) and, therefore, cobnstitutes the inlet for the polymer. The longer leg of the bore 73 receives the stub 36 (FIG. 7) and, therefore, constitutes the inlet for the water.

Threaded into the shorter leg of the L-shaped bore 73 is a check valve 74. In an operative embodiment, the check valve 74 was supplied by Circle Seal Corp. of Anaheim, Calif. The check valve 74 enables the polymer to be admitted into the chamber 70 (FIG. 6) but precludes reverse flow of any of the liquids therein back into the polymer source when the pumps have been turned off. Referring to FIG. 6, the wall 64 has a T-shaped bore 75, the axis of the longer leg of which is horizontal. The shorter legs of the bore 75 are vertically oriented. Threaded into the shorter leg of the L-shaped bore 75 is a check valve 76 identical in construction to the check valve 74. The stub pipe 52 is threaded into the third leg and, therefore, constitutes the inlet for the third liquid.

Concentrated emulsion polymer is moved by the pump 21 (FIG. 2), through the bore 72 and the check valve 74. Thus, the polymer enters the chamber in the form of a vertical spout or jet. Similarly, water is moved through the bore 73 in the form of a vertical spout or jet. The third liquid also enters the chamber in the form of a vertical spout. Tubing connects the outlet bore 71 to the site at which the activated polymer will be utilized. For example, it is comtemplated that the drum of concentrated polymer and the mixing and feeding apparatus 10 will be located next to equipment which will deliver the diluted polymer into water to be treated.

The mixer 60 also comprises an impeller 90 that mixes the liquids introduced into the chamber 70. The impeller 90 includes four slat-like fins 91, each being at right angles with respect to adjacent fins. The impeller 90 includes a bottom cap 92 having a set of four radially extending grooves at right angles with respect to each other. The top cap 93 also has a set of four radially extending grooves respectively aligned with the grooves in the cap 92. The four pairs of vertically aligned grooves respectively receive the four fins 91. Extending through the centers of the caps 92 and 93 is a shaft 94. Each cap 92 and 93 has a radially extending hole 95 therein in which is located a set screw for attaching the end caps to the shaft 94. The bottom cap 92 has a vertically extending hole through which the lower end of the shaft 94 extends. Similarly, the top cap 93 has a hole through which the top end of the shaft 94 extends. A bearing 97 press fit into the top wall 63 receives the upper end of the shaft 94. Journaled into a bearing 96 attached to the bottom wall 64 is the bottom end of the shaft 94. The impeller 90 is thus rotatably mounted in the vessel 61 about a vertical axis.

Figure 3:
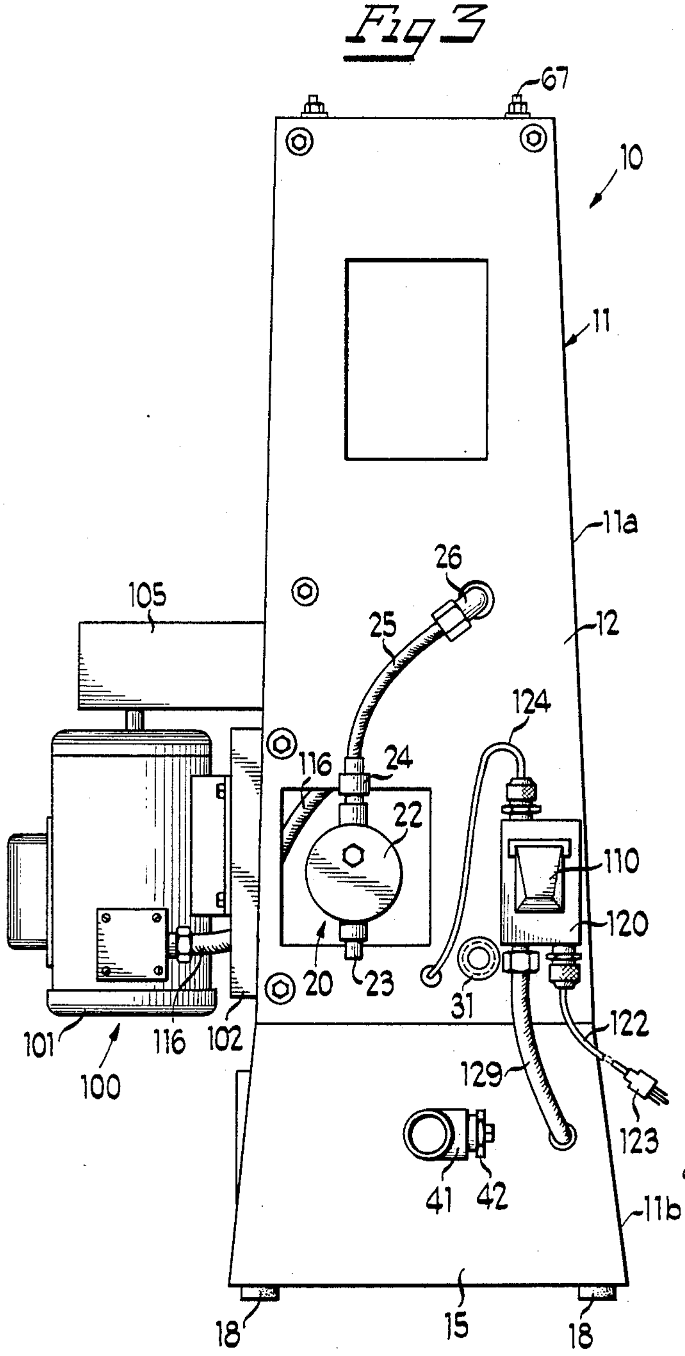
FIG. 3 is a front elevational view of the mixing and feeding apparatus.

The mixing and feeding apparatus 10 further comprises a drive mechanism 100 for rotating the impeller 90. Referring to FIG. 3, the drive mechanism 100 includes a motor 101 carried by a bracket 102, in turn attached to the panels 12 and 13. In an operative embodiments, the motor 101 was geared down so that the impeller 90 operated at 600 rpm. The rotating shaft of the motor 101 carries a toothed pulley **103*a* aligned with a toothed pulley 103*b* on the shaft 94 of the impeller 90. A toothed belt 104 engages the pulleys so that operation of the motor 101 causes the shaft 94 to rotate. The belt 104 is protected by a guard 105**.

A switch 110 couples power to the motor 101 via wires located in a conduit 116, an elbow 117 and T fittings 118 and 119 to a junction box 120. The switch 110 delivers power to all items on the apparatus 10 except the solenoid valve 33. AC power for the solenoid valve 33 is applied by lines from the junction box 120 through the T fitting 119. A cord 122 supplies AC power to the junction box 120 by way of a plug 123 which is inserted into an electrical receptacle such as a wall outlet. A cord 124 supplies electrical power to the gear motor 44.

Attached to the panel 13 is a case 127 which contains a DC power supply (not shown). AC power is brought to the AC power supply via the cord 122, the switch 110 and wires in the T fittings 118 and 119 and the conduit 128. The DC voltage produced by the power supply is coupled, by way of further wires in the conduit 128 and the T fittings 118 and 119, the junction box 110 and a conduit 129, to the conduit housing 130 of the gear motor 44. An on-off switch 131 on the case 117 turns the gear motor 44 on and off as desired, and a knob 132 controls speed of such motor.

When it is desired to utilize the mixing and feeding apparatus 10 to activate and dilute emulsion polymer, tubing attached to the inlet 23 and the other end is inserted into the emulsion polymer. Alternatively, when it is desired to use solution polymer, tubing (not shown) connected to the T fitting 41 is inserted into a container of such polymer. The pump 43 withdraws the solution polymer from the container, moves it through the tubing 47, the check valve 49, the elbows 50 and 51, the stub pipe 52 and the check valve 76 into the chamber 70. Water is admitted into the chamber 70 as in the emulsion polymer mode. The rotating impeller 90 activates the solution polymer and dilutes it. It then passes out through the outlet bore 71.

A source of water is connected to the inlet 31. When the plug 113 is inserted into the wall outlet, the solenoid valve 33 is automatically opened and water is delivered to the flowmeter 35, irrespective of the condition of the switch 111. Accordingly, water immediately flows through the flowmeter 35 and into the chamber 70, filling the same and exiting through the outlet bore 71. The output of the pump 21 is pulsating in order to be able to control accurately the rate of delivery of the polymer into the apparatus 10. The water flow is continuous however. Because the quantity of pulsating polymer is small compared to the quantity of continuous water flow, for example, 2% or less, the output of the mixing and feeding apparatus 10 is substantially continuous. That, combined with the mixing action in the mixing chamber and a retention time therein of at least 30 seconds, results in there being no measurable change of the polymer concentration in the continuous output.

When the switch 111 is turned on, the pump 21 or the pump 43 becomes energized and it withdraws the concentrated polymer from the drum. The concentrated polymer exits the nozzle 74 or the nozzle 76, as the case may be, in the form of a spout. The desired concentration of the resultant product is determined by selecting the flow rates of the polymer and the water. In the case of the emulsion polymer, the knobs 28 and 29 are adjusted, in the case of solution polymer, the knob 132 is adjusted, and in the case of the water, the knob 38 is adjusted. The switch 111 also energizes the motor 101, causing the impeller 90 to rotate.

A gear-type pump is capable of pumping the viscous solution polymer, usually in the range of 15 to 40,000 centipoise, 15,000 centipoise on average, at efficient rates. Certain diaphragm-type pumps, although having the capability of pumping solution polymer, do so at a much slower rate.

On the other hand, a gear-type pump will pump emulsion polymer, but is much more expensive. Also, a gear-type pump is incapable of delivering the polymer at low rates of 0.5 gallon per hour or so. Such low rates are often required during some phase of a water treatment cycle. Finally, a gear pump has a maximum-to-minimum rate of 5 or 10 to 1, whereas the corresponding turn-down ratio of a diaphragm-type pump is 100 or 200 to 1.

The apparatus 10, therefore, is capable of mixing and activating an emulsion polymer using a diaphragm-type pump, or activatinng and diluting a solution polymer using a gear-type pump. The activated and diluted polymer is effectively and efficiently produced.

Also, in certain situations, both polymers are used. For example, the solution polymer may be delivered on an almost constant basis, whereas the emulsion polymer may be secondarily used on an intermittent basis when the flow is unusually heavy or for a particularly difficult situation.

The apparatus 10 may be utilized in another way. Certain kinds of emulsion polymers, such as one made by Drew Chemical of Boonton, N.J., have a tendency to congeal at the nozzle 74. The gear-type pump 43 may be used to deliver to the chamber 70 an anti-congealing chemical which would prevent congealing of the emulsion polymer at the check valve 74. In that case, tubing (not shown) connected to the T fitting would be inserted into a container of the anti-congealing chemical.

The electrical system would be slightly different in the two types of operation. When the apparatus 10 is to be used to deliver one or the other of emulsion or solution polymer, then the switch 111 is so connected as to energize either the diaphragm-type pump 21 or the gear-type pump 43. When the gear-type pump 43 is used to deliver anti-congealing chemical, or when both solution and emulsion polymer are to be simultaneously used, then the switch 111 is connected so as to energize both pumps simultaneously.

What has been described therefore is an improved mixing and feeding apparatus which enables either or both solution polymer and emulsion polymer to be processed and diluted or enables emulsion polymer to be processed.

We claim:

1. Mixing and feeding apparatus for receiving polymer and water and for activating and diluting the polymer, comprising a frame, a vessel mounted on said frame defining a substantially cylindrical chamber therein, said vessel having a water inlet and a first polymer inlet and a second polymer inlet and an outlet, means for carrying water to said water inlet, first diaphragm-type metering pump means for pumping an emulsion polymer to said first polymer inlet, second gear pump means for pumping a solution polymer to said second polymer inlet, an impeller mounted in said chamber for rotation about the cylindrical axis thereof for mixing the polymer and the water, means for energizing said first pump means, means for energizing said second pump means, and control means for selectively controlling the operation of both of said means for energizing.

2. The mixing and feeding apparatus of claim 1, wherein said control means includes first control means for adjusting the rate of flow of water into said chamber, second control means for adjusting the rate of flow of the polymer into said chamber, and third control means for adjusting the rate of flow of the further liquid into said chamber.

3. The mixing and feeding apparatus of claim 1, wherein said frame includes a lower compartment and an upper compartment, said second pump means being located in said lower compartment, said first pump means being located in said upper compartment, said vessel being located on top of said second compartment.

4. The mixing and feeding apparatus of claim 1, wherein said first pump means is a pulsating pump for pulsatingly delivering the emulsion polymer to said first polymer inlet, and said second pump means is a continuous pump for continuously delivering the solution polymer to said second polymer inlet.

5. The mixing and feeding apparatus of claim 1, wherein said water inlet means and said first polymer inlet means and said second polymer inlet means are respectively first and second and third separate passageways that separately introduce the water and the emulsion polymer and the solution polymer into said chamber.

6. The mixing and feeding apparatus of claim 5, and further comprising a first check valve communicating with said second passageway to permit the emulsion polymer to flow into said chamber and to prevent any liquids from flowing out of said chamber into said second passageway, and a second check valve communicating with said third passageway to permit the solution polymer to flow into said chamber and to prevent any liquids from flowing out of said chamber into said third passageway.

7. The mixing and feeding apparatus of claim 1, wherein said water inlet means and said first polymer inlet means and said second polymer inlet means are constructed and arranged to admit the water and the emulsion polymer and the solution polymer in vertical streams.

8. The mixing and feeding apparatus of claim 1, wherein said water inlet means and said first polymer inlet means and said second polymer inlet means are at the bottom of said chamber and said outlet is at the top of said chamber.

9. The mixing and feeding apparatus of claim 1, wherein said vessel includes a cylindrical barrel, top and bottom walls, and means extending through said top and bottom wall for holding them in tight contact with said barrel disposed therebetween.

10. The mixing and feeding apparatus of claim 9, wherein said water inlet means and said first polymer inlet means and said second polymer inlet means respectively include first and second and third passageways in said bottom wall.

11. The mixing and feeding apparatus of claim 10, wherein said first and second passageways are colinear and said third passageway is transverse to said first and second passageways.

12. The mixing and feeding apparatus of claim 10, wherein said outlet includes a passageway in said top wall.

13. The mixing and feeding apparatus of claim 1, wherein said impeller includes a plurality of fins.

* * * * *

UNITED STATES PATENT AND TRADEMARK OFFICE
CERTIFICATE OF CORRECTION

PATENT NO. : 4,920,519

DATED : April 24, 1990

INVENTOR(S) : Carl L. Brazelton et al.

It is certified that error appears in the above-identified patent and that said Letters Patent is hereby corrected as shown below:

Column 7, line 23, before "polymer" insert --emulsion--; and

Column 7, line 24, change "further liquid" to --solution polymer--

Signed and Sealed this

Fourth Day of February, 1992

*Attest:*

HARRY F. MANBECK, JR.

*Attesting Officer*

*Commissioner of Patents and Trademarks*